United States Patent
Fisher et al.

(10) Patent No.: US 6,215,214 B1
(45) Date of Patent: Apr. 10, 2001

(54) SHAFT SUPPORT ASSEMBLY FOR DIRECT DRIVE MOTOR

(75) Inventors: Lynn E. Fisher, Fort Wayne, IN (US); Larry W. Straley, El Paso, TX (US); Michael A. Marks; Marc D. Pape, both of Fort Wayne, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/132,002

(22) Filed: Aug. 10, 1998

Related U.S. Application Data
(60) Provisional application No. 60/082,895, filed on Apr. 24, 1998.

(51) Int. Cl.$^7$ ....................................................... H02K 5/00
(52) U.S. Cl. ................................ 310/89; 310/85; 310/90; 310/91
(58) Field of Search ............................ 310/682, 89, 91, 310/42, 43; 417/53, 360, 415

(56) References Cited

U.S. PATENT DOCUMENTS

| | | |
|---|---|---|
| 3,082,338 | 3/1963 | Turk . |
| 3,164,736 | 1/1965 | Sleeter . |
| 3,624,434 | 11/1971 | Dafler et al. . |
| 3,714,705 | 2/1973 | Lewis . |
| 3,726,575 | 4/1973 | Moorman . |
| 3,816,782 | 6/1974 | Dow et al. . |
| 3,932,930 | 1/1976 | Dochterman . |
| 4,286,186 | 8/1981 | Hagenlocher et al. ................. 310/89 |
| 4,319,150 | 3/1982 | Roddy et al. . |
| 4,321,664 | 3/1982 | Matthai . |
| 4,340,830 | 7/1982 | Hoyer-Ellefsen . |
| 4,360,749 | 11/1982 | Neumann et al. . |
| 4,409,714 | 10/1983 | Cunningham . |
| 4,547,131 | * 10/1985 | Riffe et al. ............................ 417/53 |
| 4,567,390 | 1/1986 | Stewart . |
| 4,571,517 | 2/1986 | Chastine . |
| 4,620,425 | 11/1986 | O'Grady . |
| 4,658,107 | 4/1987 | Hildebrandt . |
| 4,661,732 | 4/1987 | Gehrt . |
| 4,711,590 | 12/1987 | Lakin . |
| 4,716,326 | 12/1987 | Fisher . |
| 4,734,602 | 3/1988 | Hauser et al. . |
| 4,757,221 | 7/1988 | Kurihashi et al. . |
| 4,781,726 | 11/1988 | Fisher et al. . |
| 4,835,428 | 5/1989 | Komurasaki et al. . |
| 4,858,303 | 8/1989 | Fisher . |
| 4,885,440 | 12/1989 | Kachuk . |

(List continued on next page.)

*Primary Examiner*—Elvin Enad
(74) *Attorney, Agent, or Firm*—Carl B. Horton, Esq.; Damian Wasserbauer, Esq.; Armstrong Teasdale, LLP (57) ABSTRACT

An electric motor assembly capable of withstanding heavy side loading includes a motor housing having a shell with first and second end shields including bearing supports having bearings therein. The first end shield further includes a flange for connecting a compressor to the motor. A rotor is rotatably mounted in the housing and supported by the bearings. A stiffening collar, positioned between a rotor core and the first end shield, surrounds a portion of a rotor shaft and provides support for the shaft against deflection due to heavy side loading. A centrifugal mechanism and a spacer are positioned on the rotor assembly outboard of the motor housing. The motor assembly also includes a cover attached to the second end shield. The cover holds a start capacitor, a run capacitor and a centrifugal switch and further includes snaps for mounting the centrifugal switch to the cover. An overload and an overload bracket extend, at least partially, through an opening in the second end shield. The overload bracket includes snaps that engage the second end shield and maintain the bracket and overload in position. A load washer having a plurality of snaps engages the second end shield and maintains the load washer in position on the second end shield.

41 Claims, 7 Drawing Sheets

U.S. PATENT DOCUMENTS

| | | | |
|---|---|---|---|
| 4,926,081 | * 5/1990 | DiFlora et al. | 310/89 |
| 4,958,096 | 9/1990 | Kachuk . | |
| 4,961,016 | 10/1990 | Peng et al. . | |
| 4,972,113 | 11/1990 | Newberg . | |
| 4,972,114 | 11/1990 | Frister . | |
| 5,006,743 | 4/1991 | King et al. . | |
| 5,015,155 | * 5/1991 | Brown | 417/360 |
| 5,079,464 | 1/1992 | King et al. . | |
| 5,093,592 | 3/1992 | Fisher et al. | 310/71 |
| 5,127,148 | 7/1992 | Lykes et al. . | |
| 5,153,471 | 10/1992 | Ottersbach | 310/68 E |
| 5,220,226 | 6/1993 | Long et al. | 310/89 |
| 5,245,237 | 9/1993 | Fisher et al. | 310/89 |
| 5,278,469 | 1/1994 | Weber et al. | 310/89 |
| 5,306,973 | 4/1994 | Butcher et al. | 310/68 C |
| 5,412,270 | 5/1995 | Butcher et al. | 310/68 R |
| 5,430,931 | 7/1995 | Fisher et al. | 29/596 |
| 5,493,158 | 2/1996 | Daniels | 310/68 R |
| 5,532,534 | * 7/1996 | Baker et al. | 310/89 |
| 5,543,671 | 8/1996 | Williams | 310/71 |
| 5,550,418 | 8/1996 | Chung | 310/89 |
| 5,602,436 | 2/1997 | Sherman et al. | 310/68 E |

* cited by examiner

SHAFT SUPPORT ASSEMBLY FOR DIRECT DRIVE MOTOR

CROSS REFERENCE TO RELATED APPLICATION

This application claims the benefit of U.S. Provisional Application No. 60/082,895, filed Apr. 24, 1998.

FIELD OF THE INVENTION

This invention relates generally to electric motors and, more particularly, to an electric motor assembly capable of withstanding heavy side loading.

BACKGROUND OF THE INVENTION

Electric motors typically include a housing, a stator, and a rotor assembly. The housing includes a shell and two end shields and houses at least a portion of the rotor assembly. The rotor assembly includes a rotor core and a rotor shaft extending through the core. Some motor types and configurations include components to modify the motor operating characteristics for particular applications. Examples of such motor types are resistance start, reactor start, capacitor start, permanent split capacitor, and capacitor start-capacitor run motors. These different types of motors are characterized by different speed-torque characteristics and may be designed to provide different theoretical maximum efficiencies. For some applications, particularly those where high starting torque is required as in compressor motors, part of the windings in the motor serve as auxiliary or starting windings which are energized during initial excitation of the motor, but which are deenergized as the motor comes up to a predetermined speed. Deenergization of such windings is often accomplished by a centrifugal switch, or other appropriate device.

Electrical components used in some motor configurations include, in addition to the centrifugal switch, at least one capacitor and an overload. These components can be mounted to one of the motor end shields to facilitate access thereto. To provide protection from moisture, dust, and other contaminants, such components are often mounted in a closed "control compartment" in which the subject electrical components are housed.

Compressor motors typically used in today's consumer markets have moved to a direct drive construction. A direct drive construction compressor motor utilizes an end shield on the normal drive end of the motor to structurally support the compressor. The end shield typically includes a flange that accepts the cylinder sleeve, piston, crank, and head that are the basic components of the compressor. This direct integration of the compressor to the motor requires the rotor shaft to withstand unusually high side loading resulting from the compression stroke. Known electric motors that drive compressors typically utilize a stepped shaft configuration to limit shaft deflection and prevent crank bearing failures. Stepped shafts are expensive to manufacture due, at least in part, to the complexity of the shaft.

Accordingly, it would be desirable to provide a capacitor start-capacitor run motor with an inexpensive to fabricate rotor shaft that is capable of handling unusually high side loading. It would also be desirable to have all electronic components of the electric motor enclosed and protected from the external environment. It would further be desirable to provide easy access to at least some of the electrical components mounted to the motor.

SUMMARY OF THE INVENTION

These and other objects may be attained by an electric motor assembly having low cost, high volume production components (e.g., shaft and collar) and a reduced bearing span as compared to known compressor motors. In one embodiment, the assembly includes a motor housing having a shell with first and second ends. A first end shield is mounted to the first shell end and a second end shield is mounted to the second shell end. The first and second end shields include bearing supports having bearings therein. The first end shield further includes a flange for connecting a compressor to the motor.

A stator, including run windings and start windings, is mounted in the housing and includes a bore extending therethrough. A rotor assembly, including a rotor core and a shaft with a substantially uniform diameter, extends through the bore in the stator. The rotor is rotatably mounted in the housing by the bearings in the end shields. A stiffening collar, positioned between the rotor core and the first end shield, surrounds a portion of the rotor shaft. The collar provides support for the shaft against deflection due to heavy side loading.

The electric motor assembly further includes a centrifugal mechanism and a spacer positioned outboard of the motor housing. The spacer is positioned outboard of the motor housing and adjacent the second end shield bearing. The centrifugal mechanism is positioned adjacent the spacer and rotates with the rotor shaft. A retaining ring is positioned on the rotor shaft adjacent the centrifugal mechanism and maintains the centrifugal mechanism in contact with the spacer.

The positioning of the centrifugal mechanism outboard of the housing allows for a reduced bearing span relative to the bearing span of known electric motors. This reduced bearing span provides further support for the rotor shaft against deflection due to heavy loading.

The electric motor assembly also includes a cover attached to the second end shield. The cover and the second end shield form an enclosure housing the centrifugal mechanism. The cover includes first and second capacitor supports and a centrifugal switch. A start capacitor is positioned in the first capacitor support and a run capacitor is positioned in the second capacitor support. The centrifugal switch is electrically connected to the start capacitor and to the run capacitor. The cover further includes snaps for mounting the centrifugal switch to the cover in a position adjacent the centrifugal mechanism. The centrifugal switch includes an actuating lever capable of being actuated by the centrifugal mechanism. When the centrifugal mechanism actuates the actuating lever, the centrifugal switch cuts out the start capacitor which deenergizes the start windings.

The motor assembly also includes an overload and an overload mounting bracket. The overload extends through an opening in the second end shield and the overload mounting bracket is positioned over the overload. The overload bracket includes snaps that engage to the second end shield and maintain the bracket and overload in position.

The electric motor assembly also includes a load washer having a plurality of snaps. The snaps engage the second end shield and maintain the load washer in position on the second end shield.

The above described electric motor assembly is less costly to manufacture because a stepped rotor shaft is not needed. Instead, a rotor shaft of substantially uniform diameter is used, and a stiffening collar is positioned on the shaft for support. Also, electrical components such as the centrifugal switch and overload are held in position by snaps. These snaps allow for quick, easy removal of the components and are inexpensive to manufacture. Also, the snaps are unitary with other components of the assembly thus reducing the number of individual parts required to assemble the motor.

DETAILED DESCRIPTION

Figure 1:
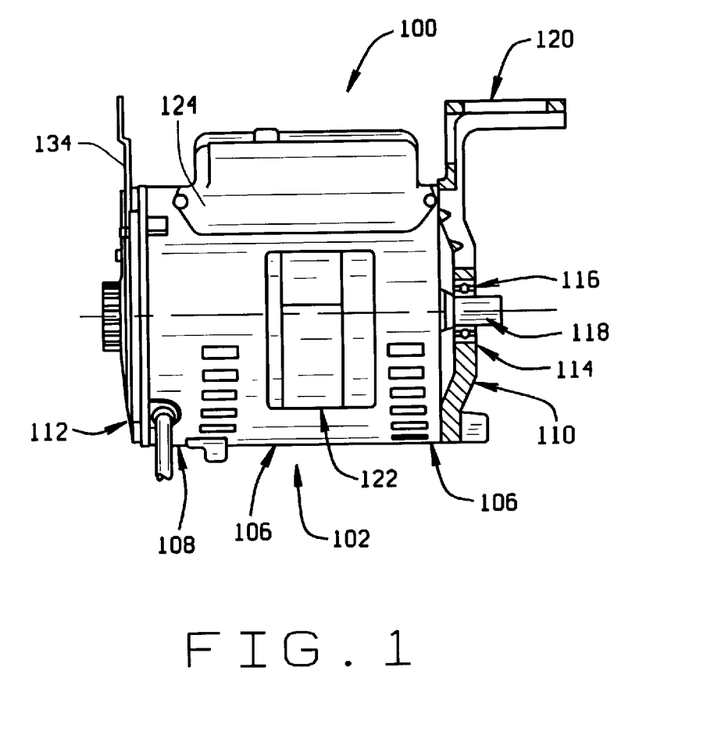
FIG. 1 is a side view of a known electric motor assembly including a cross sectional view of a drive side end shield.

FIG. 1 is side view of a known electric motor assembly 100 including a housing 102 having a shell 104 with a first shell end 106 and a second shell end 108, a first end shield 110 and a second end shield 112. First and second end shields 110, 112 include bearing supports 114 (only bearing support 114 in first end shield 110 is shown) and have bearings 116 therein (again, only bearing 116 in first end shield 110 is shown). Motor assembly 100 includes a rotor shaft 118 rotatably supported by bearings 116. First end shield 110 also includes a flange 120 for supporting a compressor (not shown) that is driven by rotor shaft 118. Rotor shaft 118 is fixedly connected to a rotor core (not shown) positioned within a stator (not shown). The stator contains run windings (not shown) and start windings (not shown). The start windings, in combination with the run windings, are used to initiate rotation of the rotor core and rotor shaft 118. Once the rotor shaft has attained sufficient rpm to achieve its normal running speed, the start winding is "cut-out" of the motor circuit so that the start winding does not adversely impact motor operation. Motor assembly 100 also includes a label 122 and a cover 124 attached to housing 102.

Figure 2:
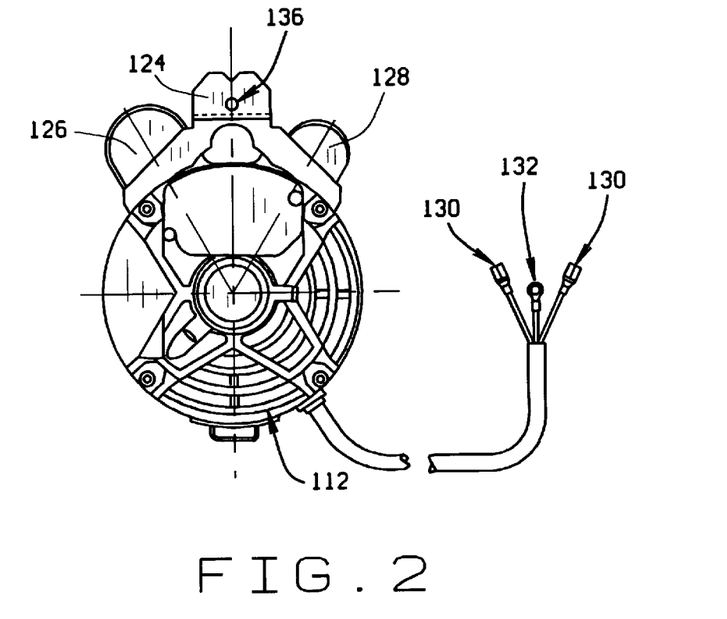
FIG. 2 is an end view of the known electric motor assembly shown in FIG. 1.

FIG. 2 is an end view of electric motor assembly 100 and illustrates a first capacitor support 126 and a second capacitor support 128 that house a start capacitor (not shown) and a run capacitor (not shown), respectively. A pair of terminals 130 and a ground eyelet 132 are connected to motor assembly 100 through housing 102 and are provided to connect a power source to motor assembly 100. Second end shield 112 includes a bracket 134 having an opening 136 therethrough.

With motor assembly 100, shaft 118 is a stepped shaft configuration which limits shaft deflection and prevents crank bearing failures. Stepped shaft 118 is complex and expensive to manufacture.

Figure 3:
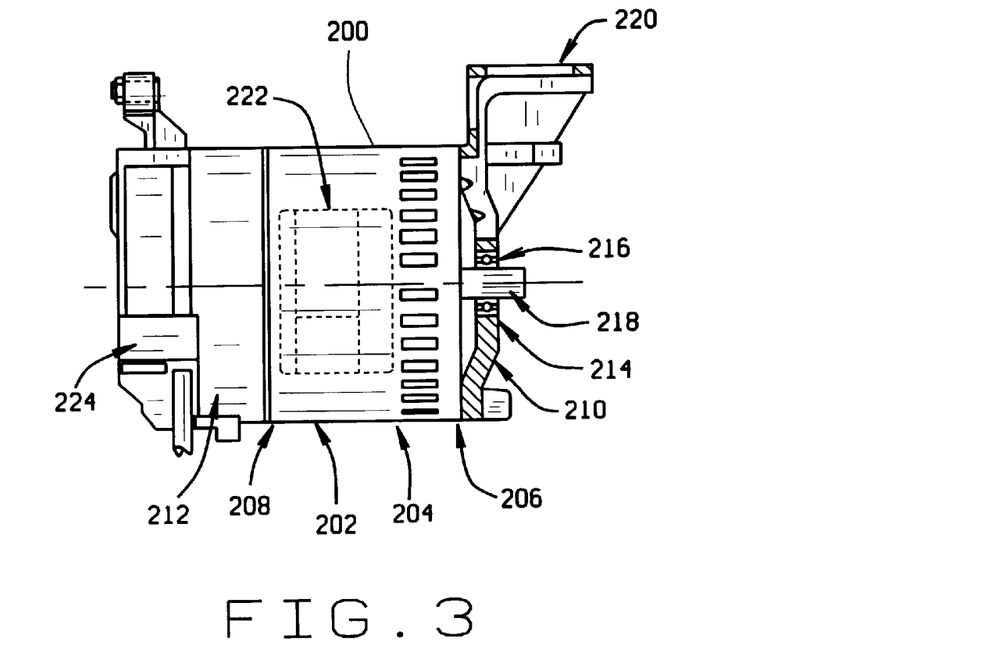
FIG. 3 is a side view of an electric motor assembly in accordance with one embodiment of the present invention including a cross sectional view of a drive side end shield.

FIG. 3 is a side view of an electric motor assembly 200 in accordance with one embodiment of the present invention. Electric motor assembly 200 includes a housing 202 having a shell 204 with a first end 206 and a second end 208, a first end shield 210, and a second end shield 212. First and second end shields 210, 212 are mounted to first and second shell ends 206, 208, respectively. First and second end shields 210, 212 include bearing supports 214 (only bearing support 214 in first end shield 210 is shown) and have bearings 216 therein (again, only bearing 216 in first end shield 210 is shown). A rotor shaft 218 is rotatably supported by bearings 216. First end shield 210 also includes a flange 220 for supporting a compressor (not shown) that is driven by rotor shaft 218. Motor assembly 200 also includes a label 222 and a cover 224. Label 222 is attached to shell 204 and cover 224 is attached to second end shield 212.

Figure 4:
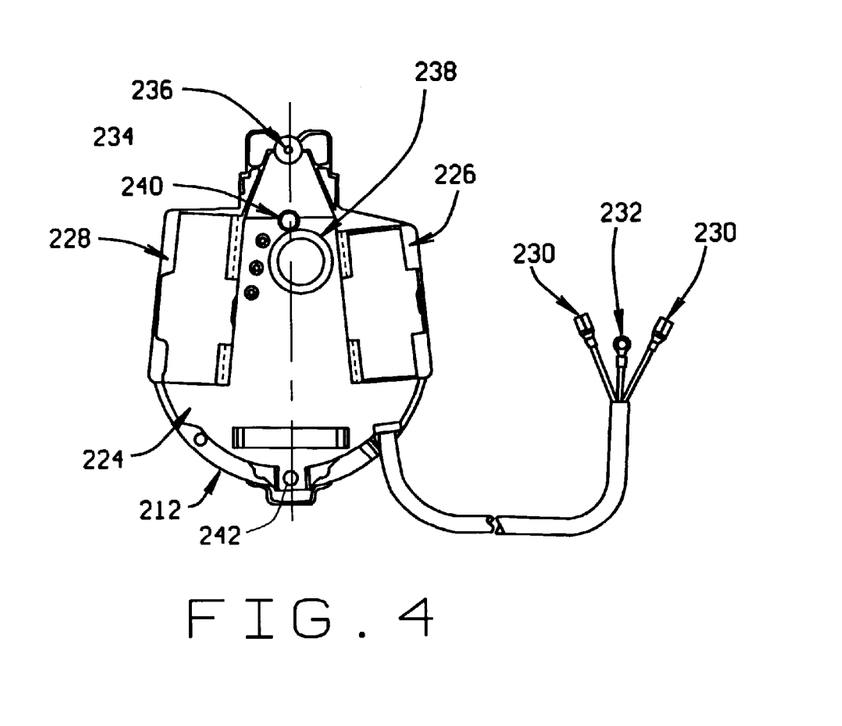
FIG. 4 is an end view of the electric motor assembly shown in FIG. 3.

FIG. 4 is an end view of electric motor assembly 200 including cover 224. Cover 224 includes a first capacitor support 226 and a second capacitor support 228. Terminals 230 and ground eyelet 232 are electrically connected to the stator windings and are provided to connect a power source to motor assembly 200. Cover 224 also includes a bracket 234 having an opening 236 therethrough. Bracket 234 is provided for attachment to a unit shroud assembly. Cover 224 further includes a removable cap 238 that provides access to the space between second end shield 212 and cover 224 while cover 224 is still attached to second end shield 212. Particularly, and as described below in more detail, an overload is secured to second end shield 212 and by removing cover 224, a user may access the overload for repair or replacement. Openings 240, 242 in cover 224 align with respective openings (not shown) in second end shield 212. A fastener (not shown), such as a screw, is inserted into each of openings 240, 242, and extends into the respective second end shield opening to connect cover 224 to second end shield 212.

Figure 5:
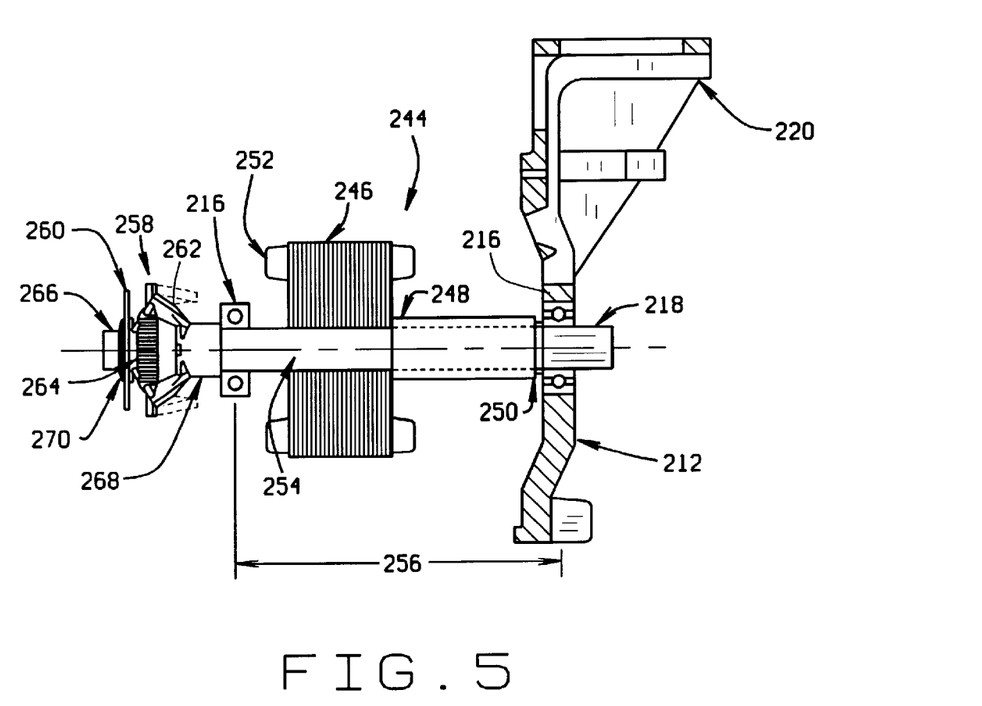
FIG. 5 is a side view of a rotor assembly including cross sectional views of the rotor core and shaft bearings from the electric motor assembly shown in FIG. 3.

FIG. 5 is a side view of a rotor assembly 244 that includes rotor shaft 218, a rotor core 246, and a stiffening collar 248 with a necked end 250. Rotor core 246 includes a plurality of laminations (not shown) and end rings 252. Rotor core 246 has a bore 254 extending therethrough, and rotor shaft 218 extends through rotor core bore 254 and is fixedly attached to rotor core 246. Rotor shaft 218 is substantially straight and, in one embodiment, has a substantially uniform diameter. A stator (not shown) is mounted in housing 202, and the stator includes start windings and run windings. Rotor assembly 244 is positioned within the stator bore.

FIG. 5 also illustrates bearings 216 supporting rotor shaft 218. Bearings 216 are supported in end shields 210 and 212. Rotor shaft 218 extends through collar 248 between rotor core 246 and first end shield bearing 216. In one embodiment, collar 248 extends from rotor core 246 to first end shield bearing 216 and is fixedly attached to rotor shaft 218. Necked end 250 is positioned adjacent first end shield bearing 216. Since electric motor assembly 200 is used to drive a compressor, heavy side loading of rotor shaft 218 occurs. Stiffening collar 248 helps prevent deflection of rotor shaft 218 during this heavy side loading by providing additional support to rotor shaft 218 in the space between rotor core 246 and first end shield bearing 216.

Rotor assembly 244 also includes a reduced bearing span 256, compared to the bearing span of known rotor assemblies, that also aids in preventing deflection of rotor shaft 218 during heavy side loading. To provide this reduced bearing span, a centrifugal mechanism 258 is attached outboard of housing 202. Centrifugal mechanism 258 includes a push collar 260 and a plurality of arms 262. Arms 262 are connected to each other by at least one spring 264. Centrifugal mechanism 258 has a bore 266 therethrough that enables centrifugal mechanism 258 to be positioned onto rotor shaft 218. Centrifugal mechanism 258 is used to cut-out a start winding (not shown) when rotor shaft 218 reaches a pre-set rotational speed. At the pre-set rotational speed, arms 262 move outwardly from rotor shaft 218 which propels push collar 260 axially along rotor shaft 218. A spacer 268 is positioned on rotor shaft 218 between second end shield bearing 216 and centrifugal mechanism 258. In one embodiment, second end shield bearing 216 is adjacent spacer 268 which is adjacent centrifugal mechanism 258. A retaining ring 270 is positioned on rotor shaft 218 adjacent centrifugal mechanism 258. Retainer ring 270 is locked onto rotor shaft 218 and maintains centrifugal mechanism 258 in contact with spacer 268 which in turn is maintained in contact with second end shield bearing 216.

Figure 6:
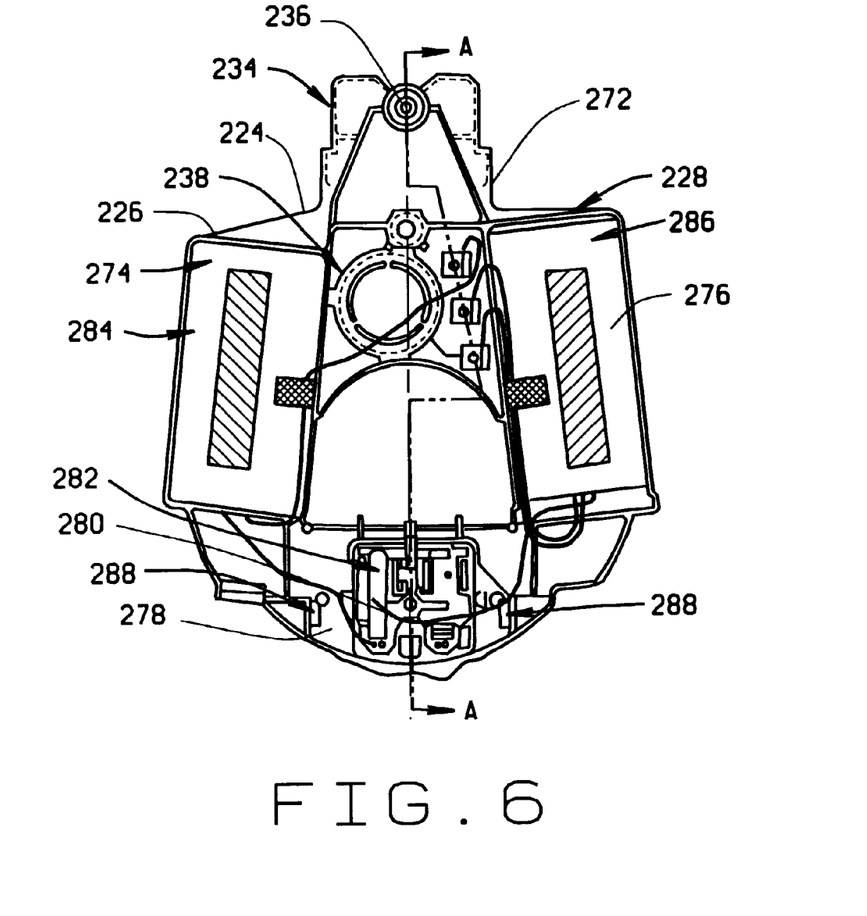
FIG. 6 is an inside view of the cover assembly from the electric motor assembly shown in FIG. 3.
Figure 7:
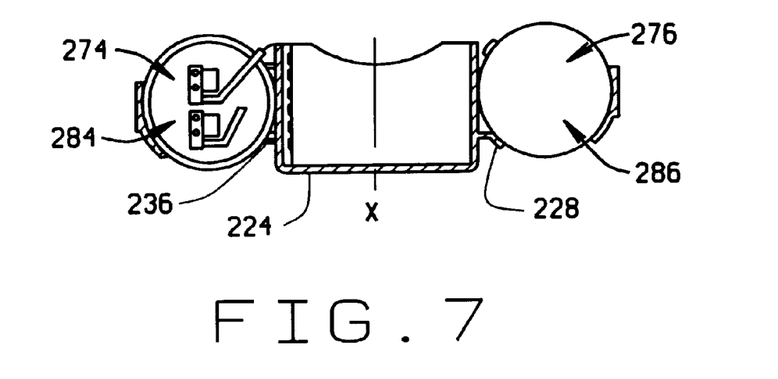
FIG. 7 is a partial top view of the cover assembly shown in FIG. 6.
Figure 8:
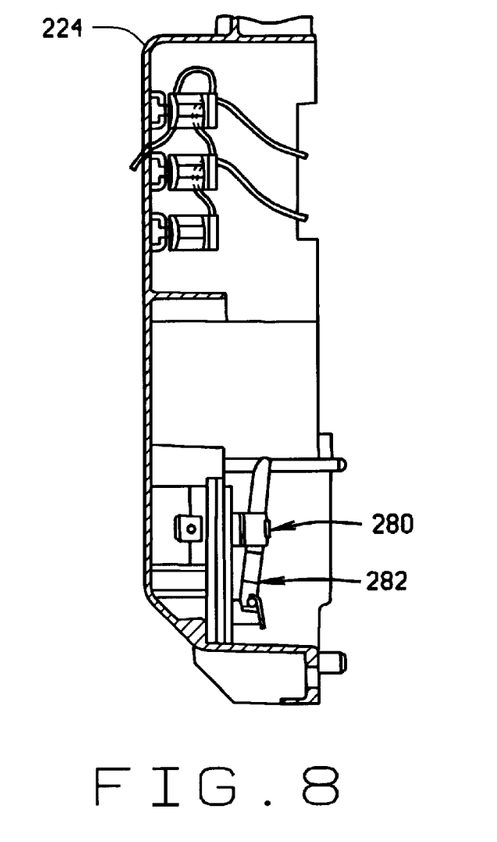
FIG. 8 is a cross section of the cover assembly shown in FIG. 6 along line A—A.

FIGS. 6, 7, and 8 are an inside view, a top view, and a cross section view of cover assembly 272, respectively. Cover assembly 272 includes cover 224 connected to second end shield 212, a start capacitor 274, a run capacitor 276, and a terminal board 278. Terminal board 278 includes a switch 280 having an actuating lever 282. Start capacitor 274 is positioned in first capacitor support 226 and run capacitor is positioned in second capacitor support 228. Start capacitor 274 and run capacitor 276 are contained within a first capacitor case 284 and a second capacitor case 286, respectively. In one embodiment, capacitor cases 284, 286 are fabricated from UL94-5V material which is relatively inexpensive and satisfies flammability requirements. UL94-5V material is commercially available from General Electric Company, Pittsfield, Mass., in Noryl HS2000X.

Switch 280 is electrically connected to start capacitor 274 which is electrically connected to the start windings (not shown). Centrifugal switch 280 is also electrically connected to run capacitor 276 which is electrically connected to the run windings (not shown). Cover 224 and second end shield 212 form an enclosure (not shown) that houses centrifugal mechanism 258 and terminal board 278. When cover 224 is attached to second end shield 212, centrifugal mechanism 258 is positioned adjacent switch 280. In one embodiment, when push collar 260 moves axially, due to rotor shaft 218 reaching a pre-set rotation speed, actuating lever 282 is actuated. The actuation of lever 282 cuts out start capacitor 274 which deenergizes the start winding circuit (not shown).

Cover 224 further includes snaps 288 that engage terminal board 278 and maintain terminal board 278 in the proper orientation when cover 224 is attached to second end shield 212. In one embodiment, snaps 288 are unitary with cover 224.

Figure 9:
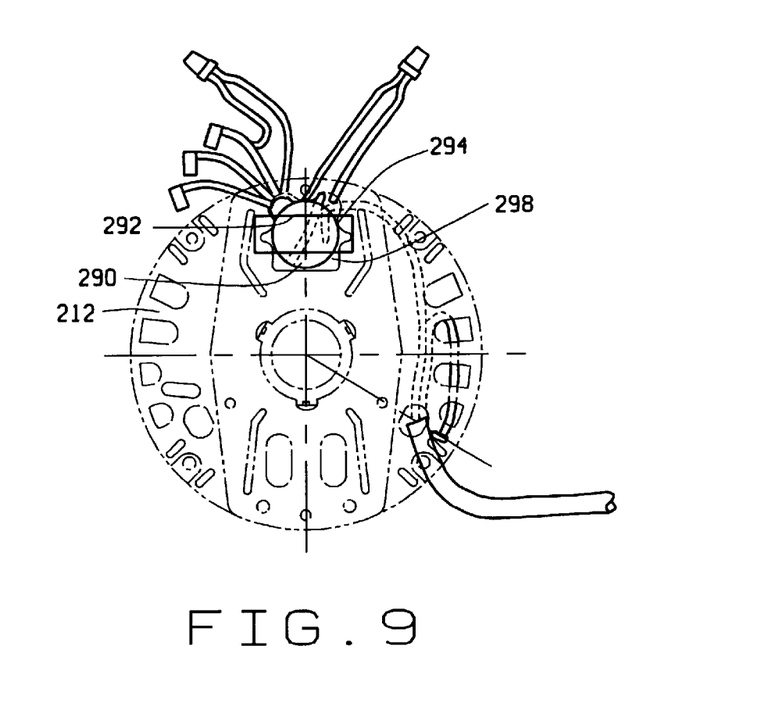
FIG. 9 is a face view of an end shield of the electric motor assembly shown in FIG. 3 illustrating an overload bracket and an overload.
Figure 10:
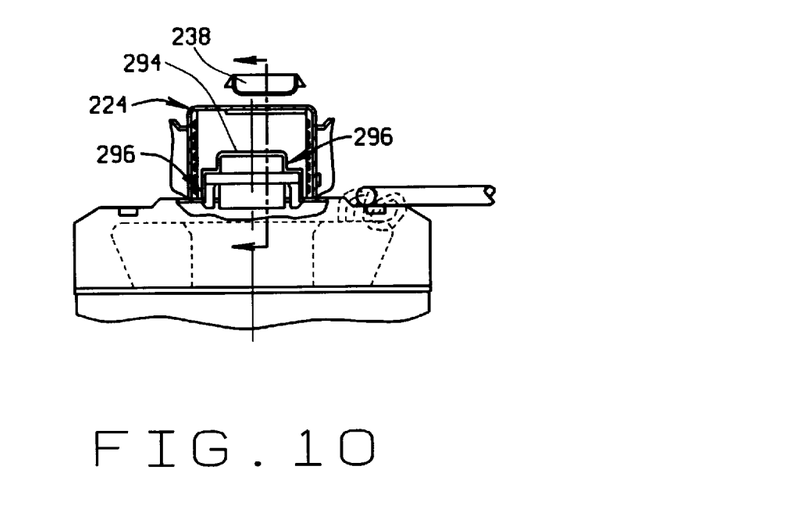
FIG. 10 is a cross section of the overload assembly shown in FIG. 9 along line B—B.

FIGS. 9 and 10 are a face view of second end shield 212 and a cross section of an overload 290 and an overload mounting bracket 292, respectively. Overload bracket 292 includes a connecting portion 294 and at least two legs 296. Second end shield 212 includes at least one opening 298 through which overload 290 extends. Overload 290 extends at least partially through opening 298 and is held in position in second end shield 212 by overload bracket 292. Legs 296 extend at least partially into opening 298 and engage second end shield 212 which maintains overload 290 in position. Cover 224 is positioned over overload 290 and overload bracket 292. Cap 238 in cover 224 is then located above overload bracket 292.

Figure 11:
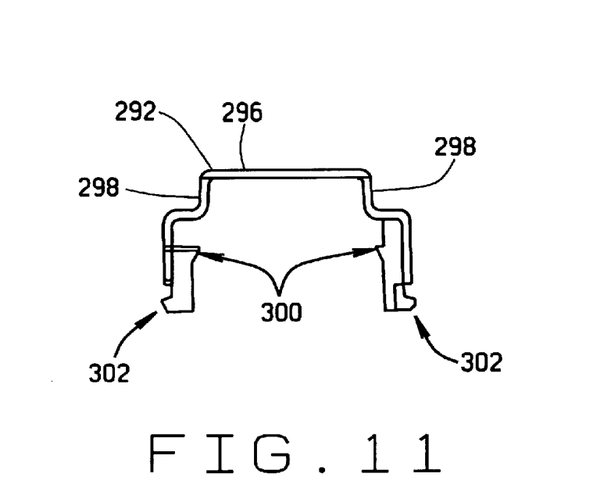
FIG. 11 is a side view of the overload bracket shown in FIG. 9.

FIG. 11 is a side view of overload bracket 292. In one embodiment, overload bracket 292 has a connecting portion 294 and two legs 296. Each leg 296 has a first snap 300 and a second snap 302 thereon. Overload 290 has cutouts (not shown) that accommodate at least a portion of legs 296. First snaps 300 are positioned on an inside of bracket 292 and engage overload 290 so that overload 290 becomes locked to bracket 292 and maintains contact therewith. Second snaps 302 are positioned on an outside of bracket 292 and engage second end shield 212 so that bracket 292 becomes locked to second end shield 212 and maintains contact therewith. In this manner, overload 290 is maintained in position at least partially within opening 298 in second end shield 212.

Figure 12:
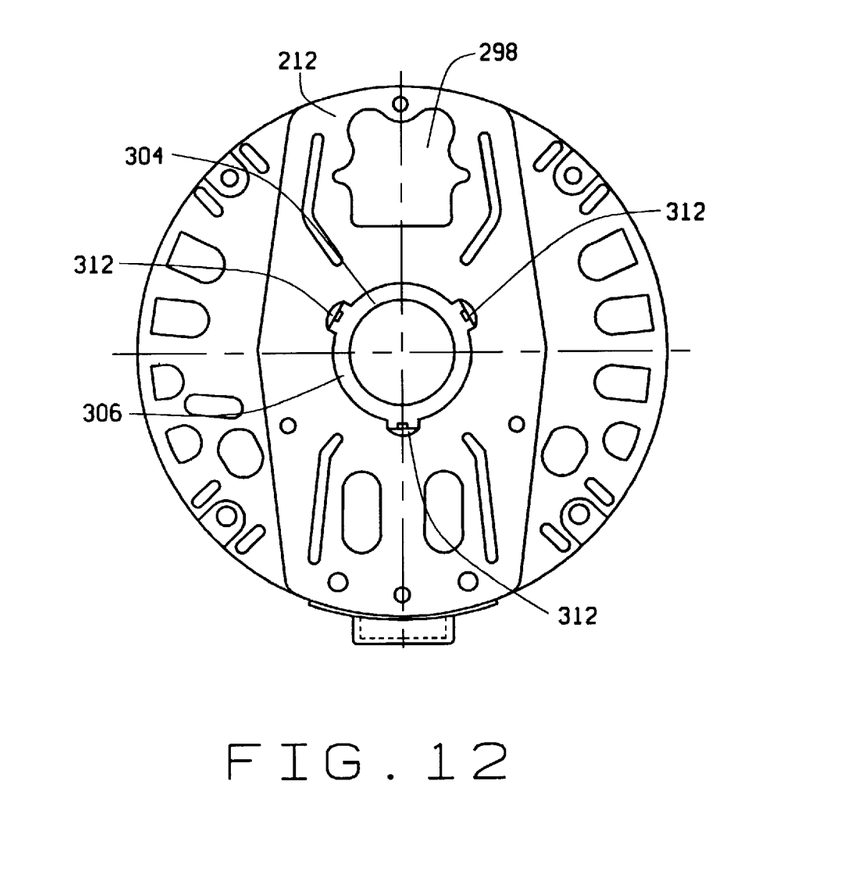
FIG. 12 is a face view of an end shield of the electric motor assembly shown in FIG. 3.
Figure 13:
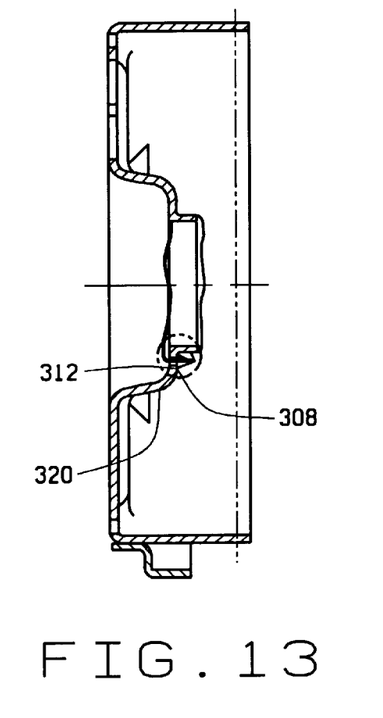
FIG. 13 is a cross section of the end shield shown in FIG. 12 along line C—C.
Figure 14:
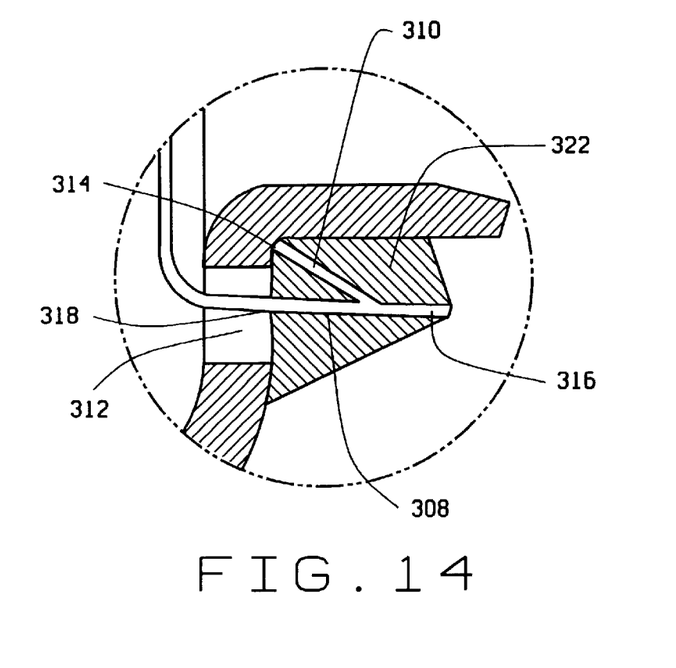
FIG. 14 is a side view of an end ring attached to the end shield shown in FIG. 13 illustrating portion D.

FIGS. 12, 13, and 14 are a face view, a cross section, and an enlarged cross section, respectively, of second end shield 212 including a load washer 304. Load washer 304 includes a ring 306, a plurality of legs 308, and a plurality of snaps 310. Legs 308 extend at least partially into a plurality of openings 312 and engage second end shield 212 thereby attaching load washer 304 to second end shield 212. In one embodiment, load washer 304 includes three legs 308, each having one snap 310. Snaps 310 include a prong 314 that extends inwardly and upwardly from a lower portion 316 of leg 308 to an upper portion 318 of leg 308. One end of prong 314 is connected to lower leg portion 316. The other end of prong 314 contacts an inner surface 320 of second end shield 212 and maintains load washer 304 in position on second end shield 212. A sealant 322 is then coated around lower leg portion 316 and snap 310 to maintain snap 310 in contact with second end shield 212 and to seal opening 312.

The above described electric motor assembly is less costly to manufacture because a stepped rotor shaft is not needed. Rather, a rotor shaft of substantially uniform diameter is used, and a stiffening collar is positioned on the shaft for support. Also, electrical components such as the centrifugal switch and overload are held in position by snaps. These snaps allow for quick, easy removal of the components and are inexpensive to manufacture. Also, the snaps are unitary with other components of the assembly thus reducing the number of individual parts required to assemble the motor.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:
1. An electric motor assembly comprising:
   a motor housing comprising a shell with first and second ends, a first end shield mounted to said first shell end, and a second end shield mounted to said second shell end, said first and second end shields comprising bearing supports having bearings therein, said first end shield further comprising a flange for supporting a compressor;
   a stator mounted in the housing and comprising a bore therethrough;
   a rotor comprising a rotor core having a bore therethrough and a substantially straight shaft extending through said rotor core bore, said rotor rotatably mounted in said housing and extending through said stator bore, said shaft rotatably supported by said bearings; and a stiffening collar having a bore therethrough, said collar configured to prevent deflection of said shaft from side loading, said shaft extending through said collar bore.

2. An electric motor assembly in accordance with claim 1 wherein said collar comprises a necked end, said collar positioned between said rotor core and said first end shield, said necked end adjacent said first end shield bearing.

3. An electric motor assembly in accordance with claim 1 further comprising a centrifugal mechanism and a spacer, said centrifugal mechanism and said spacer having a bore therethrough, said shaft extending through said centrifugal mechanism and said spacer, said second end shield bearing positioned between said centrifugal mechanism and said rotor, said spacer positioned between said centrifugal mechanism and said second end shield bearing.

4. An electric motor assembly in accordance with claim 3 further comprising a retaining ring positioned on said shaft and configured to maintain said centrifugal mechanism in contact with said spacer.

5. An electric motor assembly in accordance with claim 3 further comprising a cover attached to said second end shield, said cover and said second end shield form an enclosure housing said centrifugal mechanism.

6. An electric motor assembly in accordance with claim 5 wherein said cover comprises first and second capacitor supports and a centrifugal switch.

7. An electric motor assembly in accordance with claim 6 further comprising a start capacitor positioned in said first capacitor support and a run capacitor positioned in said second capacitor support, said centrifugal switch electrically connected to said start capacitor and said run capacitor.

8. An electric motor in accordance with claim 7 further comprising first and second capacitor cases, said first capacitor case houses said start capacitor and said second capacitor case houses said run capacitor.

9. An electric motor in accordance with claim 8 wherein said capacitor cases are fabricated from UL94-5V material.

10. An electric motor assembly in accordance with claim 6 wherein said centrifugal switch includes an actuating lever configured to be actuated by said centrifugal mechanism, wherein actuation of said switch cuts out said start capacitor.

11. An electric motor in accordance with claim 10 wherein said overload bracket comprises snaps and said second end shield comprises at least one opening, said snaps configured to extend at least partially into said openings and engage said second end shield, wherein when said snaps extend at least partially into said openings and engage said second end shield, said overload bracket maintains said overload in position.

12. An electric motor in accordance with claim 6 wherein said cover comprises snaps for mounting said centrifugal switch to said cover.

13. An electric motor assembly in accordance with claim 3 wherein said centrifugal mechanism comprises a push collar configured to move axially in response to said shaft reaching a pre-set rotational speed.

14. An electric motor in accordance with claim 1 further comprising an overload extending through said second end shield and an overload mounting bracket positioned over said overload, said bracket configured to maintain said overload in position.

15. An electric motor in accordance with claim 14 wherein said overload bracket comprises snaps that engage said overload and maintain said overload in contact with said bracket.

16. An electric motor in accordance with claim 1 further comprising a load washer comprising a plurality of snaps and wherein said second end shield comprises a plurality of openings, said snaps configured to extend at least partially into said openings and engage said second end shield, wherein when said snaps extend at least partially into said openings and engage said second end shield, said load washer is attached to said second end shield.

17. An electric motor in accordance with claim 16 wherein said plurality of snaps and said plurality of openings comprise three snaps and three openings, respectively.

18. An electric motor assembly in accordance with claim 1, said stiffening collar extending from said rotor core to said first end shield.

19. An electric motor assembly comprising:

a motor housing comprising a shell with first and second ends, a first end shield mounted to said first shell end, and a second end shield mounted to said second shell end, said first and second end shields comprising bearing supports having bearings therein, said first end shield further comprising a flange for connecting to a compressor;

a stator mounted in the housing and comprising a rotor bore therethrough;

a rotor comprising a rotor core having a bore therethrough and a substantially straight shaft extending through said rotor core bore, said rotor rotatably mounted in the housing and extending through said rotor bore, said shaft rotatably supported by said bearings; and a centrifugal mechanism and a spacer, said centrifugal mechanism and said spacer having a bore therethrough, said shaft extending through said centrifugal mechanism and said spacer, said second bearing positioned between said centrifugal mechanism and said rotor, said spacer positioned between said centrifugal mechanism and said second bearing.

20. An electric motor assembly in accordance with claim 19 further comprising a retaining ring positioned on said shaft and configured to maintain said centrifugal mechanism in contact with said spacer.

21. An electric motor assembly in accordance with claim 19 further comprising a cover attached to said second end shield, said cover and said second end shield form an enclosure housing said centrifugal mechanism.

22. An electric motor assembly in accordance with claim 21 wherein said cover comprises first and second capacitor supports and a centrifugal switch.

23. An electric motor assembly in accordance with claim 22 further comprising a start capacitor positioned in said first capacitor support and a run capacitor positioned in said second capacitor support, said centrifugal switch electrically connected to said start capacitor and said run capacitor.

24. An electric motor in accordance with claim 22 wherein said cover comprises snaps for mounting said centrifugal switch to said cover.

25. An electric motor in accordance with claim 19 further comprising an overload extending through said second end shield and an overload mounting bracket positioned over said overload, said bracket configured to maintain said overload in position.

26. An electric motor in accordance with claim 19 further comprising a load washer comprising a plurality of snaps and wherein said second end shield comprises a plurality of openings, said snaps configured to extend at least partially into said openings and engage said second end shield, wherein when said snaps extend at least partially into said openings and engage said second end shield, said load washer is attached to said second end shield.

27. An electric motor assembly in accordance with claim 19 further comprising a stiffening collar comprising a bore therethrough and a necked end, said shaft extending through said collar bore, said collar positioned between said rotor core and said first end shield, said necked end adjacent said first end shield bearing.

28. A rotor assembly for an electric motor including a motor housing comprising a shell with first and second ends, a first end shield at said first shell end, and a second end shield at said second shell end, said first and second end shields comprising bearing supports having bearings therein, said rotor assembly comprising:
- a rotor core including laminations, at least one end ring, and a bore therethrough;
- a substantially straight shaft extending through said rotor core bore and configured to extend through the bearings in the end shields, said end ring connected to said shaft; and
- a centrifugal mechanism having a bore therethrough, said shaft extending through said centrifugal mechanism, said centrifugal mechanism configured to be positioned outside of said housing and outboard of said second end shield.

29. A rotor assembly in accordance with claim 28 further comprising a spacer having a bore therethrough, said shaft extending through said spacer, said spacer positioned adjacent said centrifugal switch and configured to be positioned outboard of said second end shield.

30. A rotor assembly in accordance with claim 28 further comprising a retaining ring positioned on said shaft adjacent said centrifugal switch for maintaining said centrifugal switch adjacent said spacer, said retaining ring configured to be positioned outside of the housing and on an outboard side of the second end shield.

31. A rotor assembly in accordance with claim 28 further comprising a stiffening collar having a bore therethrough, said shaft extending through said collar bore.

32. A rotor assembly in accordance with claim 31 wherein said stiffening collar comprises a necked end, said collar positioned adjacent said rotor core and configured to be positioned within the housing and between said rotor core and the first end shield, said necked end adjacent the first end shield bearing.

33. A cover assembly for an electric motor including a motor housing comprising a shell with first and second ends, a first end shield at said first shell end, and a second end shield at said second shell end, said first and second shields comprising bearing supports having bearings therein, said cover assembly comprising:
- a cover configured to connect to the second end shield;
- a plurality of snaps; and
- a centrifugal switch, said snaps configured to connect said centrifugal switch to said cover.

34. A cover assembly in accordance with claim 33 wherein said cover comprises first and second capacitor supports.

35. A cover assembly in accordance with claim 34 further comprising a start capacitor positioned in said first capacitor support and a run capacitor positioned in said second capacitor support, said centrifugal switch electrically connected to said start capacitor and said run capacitor.

36. A cover assembly in accordance with claim 35 wherein said centrifugal switch includes an actuating lever configured to be actuated by said centrifugal mechanism, wherein actuation of said switch cuts out said start capacitor.

37. A cover assembly in accordance with claim 35 further comprising first and second capacitor cases, said first capacitor case houses said start capacitor and said second capacitor case houses said run capacitor.

38. A cover assembly in accordance with claim 33 wherein said cover comprises an integral mounting point.

39. A stator assembly for an electric motor including a motor housing and a rotor assembly, the motor housing comprising a shell with first and second ends and a first end shield at said first shell end, said first end shield comprising bearing supports having bearings therein, and a flange for connecting to a compressor, the rotor assembly comprising a rotor core having a bore therethrough and a substantially straight shaft extending through said rotor core bore and fixedly attached thereto, said rotor rotatably mounted in the housing, the shaft rotatably supported by the bearings, said stator assembly comprising:
- a stator comprising a rotor bore, said stator configured to be positioned within the housing, said stator configured to surround at least a portion of the rotor assembly;
- a second end shield comprising bearing supports having bearings therein, said second end shield configured to connect to the second end of the motor housing shell, said bearings configured to rotatably support the rotor shaft;
- an overload configured to extend through said second end shield; and
- an overload mounting bracket positioned over said overload, said bracket configured to maintain said overload in position.

40. A stator assembly in accordance with claim 39 wherein said overload bracket comprises snaps and said second end shield comprises openings, said snaps configured to extend at least partially into said openings and engage said second end shield, wherein when said snaps extend at least partially into said openings and engage said second end shield, said overload bracket maintains said overload in position.

41. A stator assembly in accordance with claim 39 further comprising a load washer comprising a plurality of snaps and wherein said second end shield comprises a plurality of washer openings, said snaps configured to extend at least partially into said washer openings and engage said second end shield, wherein when said snaps extend at least partially into said washer openings and engage said second end shield, said load washer is attached to said second end shield.

* * * * *